3,163,540
METHOD OF TENDERIZING MEAT
John M. Hogan, Orono, Maine, and Harry F. Bernholdt, Park Forest, Ill., assignors to Swift & Company, Chicago, Ill., a corporation of Illinois
No Drawing. Filed Jan. 4, 1962, Ser. No. 164,381
9 Claims. (Cl. 99—107)

This invention relates to an improved method for handling animals and more particularly to the preslaughter enzyme treatment of meat-bearing animals to provide tendered meat cuts derived from such animals, while avoiding overtenderization of glandular tissue derived from such animals.

A method for conditioning meat by introducing proteolytic enzymes into a living animal from which meat is to be derived followed by slaughtering and butchering is disclosed in U.S. Patent No. 2,903,362 to Jack F. Beuk et al. The method disclosed in this patent is highly effective and represents a significant advance in the continuing effort by meat packers to provide more tasty, tender meat cuts for the consumer. The method involves introducing a proteolytic enzyme into the living animal's system and slaughtering the animal after the enzyme has been uniformly distributed throughout the vascular system.

This uniform distribution of the enzyme in the vascular system involves contact of the muscle cuts and also organs such as the liver and kidney with a tendering amount of the enzyme. Glandular tissues such as those characteristic of the liver and kidney are soft compared to muscle tissues and furthermore greater amounts of enzyme are concentrated in the liver and kidney as the blood circulates because of the greater vascularity of these organs. As a result of these factors, it is sometimes important in commercial operations that the liver and kidney from animals treated by the uniform vascular distribution method be carefully handled to avoid overtenderization and deterioration in texture of these organs.

In addition, it has been found that a small number of animals manifest varying degrees of depression, distress or shock when enzymes are introduced into their vascular systems and permitted to circulate to all tissues. Although this effect is of an unpredictable and variable nature occurring in only a small number of cases, it does represent a commercial problem with regard to handling of the animal prior to slaughter and possible downgrading of the carcass due to lesions from such reactions. These "reactors," which is the term used to characterize this minority of animals suffering varying degrees of depression, represent a commercial hindrance in planning rapid processing lines since there may be difficulties in handling the animals and the animals may require special attention. While it is possible to minimize the number of adverse reactions in all animals by refining and preconditioning the enzyme employed in the process, difficulties have, in some cases, been encountered with reactors using these refined solutions. These difficulties require slowing of the manufacturing operations both because of the special treatment which the animals require and also in connection with handling of the carcass.

It is, accordingly, an object of this invention to provide a method for handling animals from which meat is to be derived whereby adverse physiological reactions in the animal and lesions in the carcass previously encountered in ante-mortem enzyme treatments are minimized.

A further object of the invention is the provision of a method for preferentially distributing proteolytic enzymes throughout the muscle tissue of live, meat-bearing animals while minimizing distribution of said enzymes throughout glandular tissue.

A further object of the invention is to provide meat carcasses having proteolytic enzyme distributed throughout the meat tissue in a tendering amount and which carcass is characterized by substantial freedom from lesions.

Still another object of the invention is to provide an improved method for introducing proteolytic enzymes into the vascular system of live, flesh-bearing animals and slaughtering said animals within a period of time which insures nonuniform enzyme distribution.

Additional objects of the invention, if not specifically set forth herein, will be readily apparent to those skilled in the art from the detailed description of the invention which follows.

Generally, the invention relates to an improved method of handling animals in the treatment of such animals prior to slaughter with proteolytic enzymes. The method includes the steps of rapidly introducing proteolytic enzymes into the living animal's vascular system and promptly slaughtering the animal. It is thus possible to insure nonuniform distribution of the enzyme throughout the vascular system and supply sufficient enzyme to muscle and other tissues to insure that the meat cuts derived from such animals will possess an improved tenderness upon cooking. Concurrently, avoidance of a concentration of the enzyme in highly vascularized glandular organs such as the liver and kidney is assured. Moreover, the incomplete distribution of enzymes insures that lesions in the carcass resulting from enzyme action on certain organs are minimized. The method of this invention provides all the desirable advantages of the process disclosed and claimed in the Beuk et al. patent and, in addition, insures that livers and kidneys will not be overtenderized and carcass lesions will be further reduced.

More specifically, the invention comprises the steps of introducing enzymes into the vascular system of the animal in a very short period of time and promptly sticking the animal to permit the blood to flow out of the animal's system, with the total elapsed time between the start of enzyme introduction to sticking being controlled so as not to exceed about 56 seconds which is the time required for one circulation in cattle. Distribution of the enzyme to various parts of the animal's body is thus controlled and continuous cycling of the injected material in the circulatory system is terminated. By means of this control adequate distribution of enzyme to muscle tissues and other tissues which are enhanced by the presence of enzymes distributed therein is attained, but concentration of enzyme in organs such as the liver and kidney is avoided.

The enzyme introduction step is carried out by any means which insures introduction of the enzyme into the vascular system of the living animal. In the case of sheep, the enzyme preferably in a liquid carrier is injected into the jugular vein, using a needle connected by a tube to a gravity flow bottle containing the enzyme. Cattle, calves, heifers, hogs, etc. can be injected with the same type of device, but poultry are usually injected with a hypodermic syringe into one of the exposed veins such as the humeral or internal metatarsal veins. Flow of solution into the animal can be by gravity or utilizing some pressure to speed up the enzyme introduction step. The concentration of enzyme in solution should be sufficient to insure that the total amount of solution required for a given animal will not necessitate an extended period of time for introduction. Solutions of plant-derived proteolytic enzymes such as papain, ficin and bromelin and mixtures thereof having proteolytic activities of around 500–14,000 tyrosyl units/milliliter are satisfactory for this purpose. Suitable enzyme formulations which can be employed in the process to obtain outstanding results include those disclosed in co-pending application S.N. 122,110, filed July 6, 1961, by John M. Hogan.

Other proteolytic enzymes such as those derived from bacterial or fungal sources may also be employed in the process with varying degrees of effectiveness. Typical proteolytic enzymes derived from molds include those from *Aspergillus oryzae, Aspergillus alliaceus,* and *Aspergillus wentii.* Bacterially derived enzymes include, among others, those isolated from the over-all culture of *Bacillus mesenteroides, Bacterium subtilis,* and *Clostridium welchii.*

For best results it is desired that the enzyme be suspended in an aqueous solution in a concentration to provide at least about 500 tyrosyl units per milliliter of activity. Preferably, the enzyme solution should be of a concentration sufficient to provide at least about 1,000 tyrosyl units per milliliter of activity. Such a solution permits introduction of the enzyme into the animal in a quantity of about 0.1–.35 ml. per lb. of live animal weight For the average animal, in the range of 800–1,100 lbs. the total volume of enzyme solution required is then in the range of 80–385 ml. and this amount can be injected in about 16–77 seconds by gravity using present equipment (needle gauge, etc.). More dilute solutions having only 500 tyrosyl units per milliliter must be introduced at the rate of about 0.2–0.7 ml. per lb. and with the average animal this requires 160–770 ml. total injection and 32–154 seconds. Because these solutions require an excessive injection time over about 35 seconds they are not favored in the present method unless means for injecting under pressure are provided. More concentrated solutions having about 5,000 tyrosyl units per milliliter activity require only that 0.02–0.27 ml. per lb. be introduced and the total amount is only 16–77 ml., which can be injected in 3–16 seconds. Greater care is required with these more concentrated solutions in measuring enzyme concentration and metering of the solution during injection.

A very desirable enzyme composition is a papain solution having an activity represented by about 3,000 tyrosyl units per ml. and this solution can be employed in cattle introducing about 27–128 ml. into the animal in about 5–26 seconds. For smaller animals, smaller volumes of the solution are required and, accordingly, injection time can be increased proportionately. The most advantageous method for treating large animals such as cattle involves the use of an aqueous enzyme solution having an activity of 5,000 tyrosyl units per milliliter. This solution is diluted to a constant volume of 80–100 ml. with water and can be injected very rapidly.

The total time elapsing from the beginning of enzyme introduction into the animal and sticking of the animal should, for best results, not exceed about 60% of the time required for one cycle of the animal's circulatory system. In the case of larger animals such as cattle, this time interval is longer than with sheep, for example. The circulation cycle for cattle is around 50–56 seconds, while for sheep circulation time is about 27–33 seconds. Blood probably undergoes one cycle in calves in about 5–10 seconds and in hogs in about 10–15 seconds. Poultry such as large roosters and turkeys, have a circulation time of around 2–3 seconds. It is advisable within the limits presented by problems associated with mechanical handling of the animals to complete the enzyme introduction and slaughter as promptly as possible. With some animals it is recommended that the enzyme introduction be completed in a period of less than about twenty-five seconds and the animal slaughtered within about ten seconds after completion of the introduction of enzyme. Thus the benefits of the improved method may be realized when the total elapsed time between the beginning of enzyme introduction and slaughter is not more than about thirty-five seconds. In the case of other species, the preferred time interval may be quite different. Poultry, for example, have a very short time circulation cycle and with poultry, very desirable results are obtainable where enzyme introduction and slaughter are completed in not more than about three seconds.

Livestock generally can be handled in the manner disclosed herein within the time intervals noted without special equipment, but it is more convenient if special handling techniques are employed. Simple physical restraining methods may be used to insure that movement of the animal during enzyme introduction and slaughter is held to a minimum. Immobilization practices should be employed and chemical immobilization appears to provide a very suitable means for handling animals treated in accordance with the process. Chemical relaxants such as the muscle relaxant compositions can be administered by parenteral injection, local absorption and inhalation. Certain chemical relaxant materials are also effective when administered orally. The dosage of the relaxant should be sufficient to cause substantially complete inhibition of voluntary movement by the animal and substantial loss of reflex activity of the skeletal muscles. The animal immobilized with a muscle relaxant drug can be shackled and bled or bled in a horizontal position prior to recovering from the effect of the drug since heart action is not impaired when sublethal doses of the relaxant are used. Suitable muscle relaxants include curarine, tubocurarine chloride, succinyl choline chloride, succinyl choline dichloride, succinyl choline iodide and the diiodide, succinyl choline bromide and the dibromide, methenesin gallamine triethiodide, and decamethonium bromide. The succinyl choline halides, particularly the dichloride, are preferred inasmuch as they are rapidly hydrolyzed into two nontoxic compounds within the animal tissues.

Succinyl choline dichloride can be prepared for intravenous injection by preparing a weak solution containing about 2 mg. succinyl choline dichloride per cc. of water and for intramuscular and intraperitoneal injection, a solution of approximately 20 mg. per cc. of water is employed. The amount to be used depends upon the method of administering the relaxant (injection, absorption, inhalation, etc.) and also upon the size of the animal. Amounts varying from about 0.09–0.15 mg./kg. of animal weight have been used in intravenous injections in sheep while cattle only require about half this amount to obtain a similar degree of immobilization. The chemical immobilization technique disclosed in co-pending application S.N. 43,743, filed July 19, 1960, by William O. Reece, can be advantageously employed for immobilizing animals to be treated in accordance with the method of the invention.

It is also desirable in some cases to insensibilize the animal prior to or after the enzyme introduction step. Insensibilization can be achieved by mechanical stunning, electrical stunning, electrical anaesthesia, with chemical anaesthetics or by the gas technique employing carbon dioxide and oxygen or carbon dioxide. In all of these techniques the animal is rendered unconscious and enzyme injection can be carried out either prior to or shortly after the animal is rendered insensible. If mechanical stunning is employed prior to injection of the enzyme, a 2–3 minute delay between knocking and injection is recommended to permit the heart action to become stabilized. In the preferred over-all process immobilization with a muscle relaxant composition is employed (followed by electrical anaesthesia or gas) administration of the enzyme and, finally, sticking.

In order to demonstrate the superior results of the method of this invention several animals were treated by the method of Beuk et al. effecting uniform distribution of the enzyme in the vascular system and the meat cuts, as well as livers and kidneys from such animals, were compared for tenderness and texture with livers and kidneys, as well as meat cuts, derived from animals treated in accordance with the instant method. The examples which follow are intended to illustrate specific embodiments of the invention and the invention should not be considered limited by these examples.

EXAMPLE I

An aqueous solution of papain containing 18 mg. papain per ml. and having an enzyme activity of 1,000 tyrosyl units per ml. was injected into the jugular vein of each of two mature sheep (about 150 lbs. each) at a level of 0.35 ml. per lb. by weight. The injection was completed in 15 seconds. One of the treated animals was stuck immediately; the other was permitted to live for 20 minutes prior to sticking. The livers and kidneys from each animal were cooked and the cooked organs were observed. A control animal not treated with enzyme was slaghtered at the same time and the livers and kidneys of this control were compared to those of the two treated animals. The kidneys were simmered for 15 minutes in water and the livers were evaluated by slicing a ¼ inch thick, 1 sq. in. piece from the heavy end of the liver. This piece is placed in a deep fat fryer containing liquid cooking fat held at 250° F. The livers are cooked in the fat for 2 minutes. The softness or mushiness of the liver is determined empirically by a panel of five persons. The results on kidney and liver texture from the animals treated is as follows:

| Animal Treatment | Liver Texture | Kidney Texture |
| --- | --- | --- |
| Control—No Enzyme | 10 | Normal. |
| Enzyme-treated, slaughtered immediately. | 9 | Slight softening. |
| Enzyme-treated, slaughtered after 20 minutes. | 4.7 | Complete disintegration. |

EXAMPLE II

An aqueous solution containing 90 mg. per ml. papain and having an enzyme activity represented by 5,000 tyrosyl units per ml. was injected into the jugular vein of each of a series of mature sheep at a level of 6.3 mg. per lb. live weight. The time from beginning to the end of injection was varied from 3 seconds (no dilution) to 17 seconds (approximately 6 fold dilution). Flow rate of the solution into the animal's system is about 5 ml./sec. The animals were held from 4 seconds to 20 minutes following injecting before sticking. The total time from beginning of injection to bleeding was varied from 7 seconds to 20 minutes. Samples of shoulder and leg roasts, as well as the livers, were cooked and the meat was evaluated for tenderness and texture by a panel of five experts. The characteristics of the meat are shown in Table I, which follows:

*Table I*

| Animal No. | Injection Time, sec. | Holding Time, sec. | Total Injection and Holding Time, sec. | Tenderness Leg Roast | Tenderness Shoulder Roast | Texture of Liver |
| --- | --- | --- | --- | --- | --- | --- |
| 1 | 3 | 4 | 7 | 8.0 | 9.3 | 10.0 |
| 2 | 4 | 8 | 12 | 9.0 | 8.7 | 9.5 |
| 3 | 5 | .8 | 13 | 10.0 | 9.8 | 8.5 |
| 4 | 9 | 10 | 19 | 10.0 | 9.8 | 8.0 |
| 5 | 5 | 15 | 20 | 9.7 | 10.0 | 6.0 |
| 6 | 8 | 15 | 23 | 10.0 | 9.8 | 5.8 |
| 7 | 17 | 6 | 23 | 9.3 | 7.5 | 5.3 |
| 8 | 5 | 20 | 25 | 9.7 | 10.0 | 6.3 |
| 9 | 15 | 10 | 25 | 9.3 | 9.3 | 7.3 |
| 10 | 15 | 10.5 | 25.5 | 9.8 | 8.5 | 7.0 |
| 11 | 12 | 15 | 27 | 9.0 | 9.0 | 5.3 |
| 12 | 8 | 20 | 28 | 10.0 | 10.0 | 6.3 |
| 13 | 15 | ¹ 20 | | 9.4 | | 4.0 |

¹ Minutes.

It can be seen that, while satisfactory tenderization of roasts is obtained even where the holding time is extended, the texture of the liver is less than is desired when total time for injection and holding exceeds 19 seconds (about 60% of total circulation time). However, this is a substantial improvement over texture of livers of animals treated in accordance with the method of the J. F. Beuk patent.

EXAMPLE III

Each of a series of 25 head of cattle was injected with an aqueous solution of commercial food grade papain, the amount injected being sufficient to provide 4 mg. of papain per lb. of live weight. About 85–90 ml. of solution was injected into each animal at the rate of about 5 ml. per second. With 10 of the cattle the injection was completed in about 19–21 seconds and the cattle were bled immediately. The total time from the beginning of the injection to bleeding was 30–55 seconds. The remaining cattle were injected at a rate sufficient to complete the injection in 7–9 seconds. These animals were held for a period of 2–30 minutes before bleeding. Samples of steaks, roasts, livers and kidneys were taken and subsequently cooked for evaluation of tenderness and texture by a panel of experts. The tenderness of steaks and roasts from the two groups did not differ significantly. The average mean tenderness with the two groups is as follows:

| Treatment | Tenderness (Mean) | |
| --- | --- | --- |
| | Roast | Steak |
| Animals treated in 30–55 seconds | 8.55±0.18 | 7.46±0.59 |
| Animals treated in 2–30 minutes | 8.98±0.49 | 7.86±0.86 |

The texture ratings of the livers and kidneys of the animals injected and bled within a period of 55 seconds were satisfactory, whereas those of other animals injected and bled over a period of 2–30 minutes exhibited varying degrees of softness and/or mushiness.

| Treatment | Texture | |
| --- | --- | --- |
| | Liver | Kidney |
| Animals treated in 30–55 seconds | 8.25 | Normal. |
| Animals treated in 2–30 minutes | 5.50 | Mushy. |
| Control | 8.56 | Normal. |

The livers were cooked by pan-frying a ½ in. thick slice, while the kidneys were simmered in water for 15 minutes.

EXAMPLE IV

A series of 12 turkeys averaging about 25–30 lbs. each were injected with an aqueous solution of papain utilizing enough of the solution to provide 0.1 ml./lb. of a solution having an activity represented by 1,000 tyrosyl units/ml. A conventional syringe was used and injection was into the jugular vein. One group of the turkeys were slaughtered immediately after completion of the injection, another group was slaughtered 5 seconds after completion of the injection, and another group was slaughtered 10 seconds after completion of the injection. Tenderness and texture of light and dark meat was evaluated and the texture of livers was also measured.

The benefits resulting from quick sticking (less than 5 seconds after injection) were apparent. The results are not quite as striking as with the cattle, sheep, calves, etc., but significant benefits accrue from the use of the method in handling poultry, particularly turkeys.

As has been noted previously, tenderness and texture of the meat cuts and of the livers were determined by a panel of experts with the significance of the values given for tenderness and texture being as follows:

| Quality Rating | Numerical Rating |
|---|---|
| Excellent | 10 |
| Good + − | 9, 8, 7 |
| Fair + 0 − | 6, 5, 4 |
| Poor + − | 3, 2 |
| Unsatisfactory | 1 |

In all cases, little or no lesions were noted in the carcasses treated in accordance with the method of this invention. With those animals injected with enzymes, but not treated in accordance with the rapid method there was some evidence of hyperemia of the fascia, hyperemia and hemorrhage of the lungs, hyperemia of the mediastinal lymph nodes, some edema of the larynx.

There is thus provided by the invention a process which can be integrated in the normal kill procedures of existing slaughter houses without interference with the flow of cattle through the slaughter house. There is a substantially greater uniformity of tenderization of livers and kidneys as compared to roasts and steaks derived from the same animal. It is thus possible to adapt the method for use in the processing of cattle, calves, heifers, sheep, hogs, poultry, and other livestock animals normally processed for food.

As used herein, the term "sticking" is used in the generally accepted sense employed in the meat packing industry as the act of piercing or penetrating the vascular system of an animal to permit the escape of blood of the animal to the outside. Generally there is no control over the rate of bleeding and when the circulatory system is pierced, bleeding of the major part of the blood can take place over a period of about 5–15 seconds. In all cases, conventional bleeding procedures are sufficient to insure that the blood and enzyme is removed from the animal within a time sufficient to insure that the enzyme is not circulated through the animal's system.

Obviously, many modifications and variations of the invention as set forth herein may be made without departing from the spirit and scope thereof. Accordingly, only those limitations should be imposed as are indicated in the appended claims.

We claim:

1. An improved method for preparing tender meat which comprises: introducing a proteolytic enzyme into the vascular system of a living meat-bearing animal over a period of time approximating not more than about ⅗ of the time for one circulation cycle of said animal's circulatory system; and promptly slaughtering said animal before the enzyme is uniformly distributed throughout the animal body, whereby to obtain preferential enzyme distribution to muscle tissue and minimize concentration of enzyme in glandular tissue.

2. A method for use in conditioning meat so as to provide tender meat cuts and avoid excessive tenderization of liver and avoid the development of carcass lesions in animals treated with proteolytic enzymes, including the steps of: introducing proteolytic enzymes into the vascular system of a living meat-bearing animal over a period of less than about 25 seconds; and promptly slaughtering said animal before the enzyme is uniformly distributed throughout the animal body, with the total elapsed time between the beginning of enzyme introduction and slaughter not exceeding about 35 seconds.

3. In the process for producing tender meat products, the step for obtaining nonuniform distribution of proteolytic enzyme in animal tissue comprising: introducing a proteolytic enzyme into the vascular system of a living animal from which meat is derived; and promptly slaughtering said animal with the enzyme introduction and slaughter being completed in not more than about 35 seconds and before the enzyme is uniformly distributed throughout the animal body.

4. An improved method for producing animal carcasses having proteolytic enzyme distributed nonuniformly throughout the animal comprising: introducing an amount of proteolytic enzymes sufficient to produce tendered meat cuts into the vascular system of a living flesh-bearing animal in less than about 25 seconds; sticking said animal before the enzyme is uniformly distributed throughout the animal body and within about 10 seconds after completion of said introduction; and bleeding said animal whereby to remove blood from the animal's circulatory system.

5. An improved method for treating sheep to provide sheep carcasses having proteolytic enzymes distributed nonuniformly throughout the animal body comprising: introducing an amount of proteolytic enzymes sufficient to produce tendered meat into the vascular system of living sheep; and promptly slaughtering said sheep with the enzyme introduction, slaughter being completed in not more than about 20 seconds after the enzyme introduction and before the enzyme is uniformly distributed throughout the animal body.

6. An improved method for producing tendered poultry having proteolytic enzymes distributed throughout the poultry comprising: introducing a tendering amount of proteolytic enzymes into the vascular system of live poultry; and promptly slaughtering said poultry after the enzyme introduction and before the enzyme is uniformly distributed throughout the poultry.

7. A method for preferentially distributing proteolytic enzymes in muscle tissue while minimizing distribution of said enzyme in glandular tissue of living animals from which meat is derived comprising: introducing a tendering amount of proteolytic enzymes into the vascular system of a living meat-bearing animal over a period of time not exceeding about 25 seconds; and promptly sticking said animal before the enzyme is uniformly distributed throughout the animal body whereby to prevent further circulation of blood in said vascular system.

8. An improvement in the meat tendering method wherein proteolytic enzymes are introduced into the vascular system of a living meat-bearing animal and the animal is slaughtered after a time interval sufficient to obtain nonuniform enzyme distribution in said animal's system comprising: introducing said enzyme into said animal in an amount sufficient to produce tendered meat; and promptly slaughtering said animal within about 56 seconds and before uniform distribution of said enzyme is obtained.

9. An improved method for producing meat having subtantial tenderness when cooked comprising: immobilizing a living flesh-bearing animal; introducing a tendering amount of proteolytic enzymes into the vascular system of said immobilized animal; and slaughtering said animal before the enzyme is uniformly distributed throughout the animal body and within a time period not exceeding about 60% of the time required for one cycle of the animal's circulatory system.

References Cited in the file of this patent

UNITED STATES PATENTS

| 2,903,362 | Beuk et al. | Sept. 8, 1959 |
| 3,052,551 | Hogan | Sept. 4, 1962 |

UNITED STATES PATENT OFFICE
CERTIFICATE OF CORRECTION

Patent No. 3,163,540                  December 29, 1964

John M. Hogan et al.

It is hereby certified that error appears in the above numbered patent requiring correction and that the said Letters Patent should read as corrected below.

Column 3, line 31, for "0.02-0.27" read -- 0.02-0.07 --; line 65, strike out "about" column 5, line 12, for "slaghtered" read -- slaughtered --; column 8, line 11, for "enzyme" read -- enzymes --; line 59, for "subtantial" read -- substantial --.

Signed and sealed this 4th day of May 1965.

(SEAL)
Attest:

ERNEST W. SWIDER                        EDWARD J. BRENNER
Attesting Officer                        Commissioner of Patents